US008909671B2

(12) United States Patent
Pallares Lopez et al.

(10) Patent No.: US 8,909,671 B2
(45) Date of Patent: Dec. 9, 2014

(54) LOAD SHEDDING IN A DATA STREAM MANAGEMENT SYSTEM

(75) Inventors: Miguel Angel Pallares Lopez, Madrid (ES); Luis Maria Lafuente Alvarez, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/994,954

(22) PCT Filed: Dec. 23, 2010

(86) PCT No.: PCT/EP2010/070656
§ 371 (c)(1),
(2), (4) Date: Jun. 17, 2013

(87) PCT Pub. No.: WO2012/084051
PCT Pub. Date: Jun. 28, 2012

(65) Prior Publication Data
US 2013/0268560 A1    Oct. 10, 2013

(51) Int. Cl.
*G06F 17/30*    (2006.01)
*H04L 29/08*    (2006.01)
*G06F 9/50*    (2006.01)

(52) U.S. Cl.
CPC .......... *H04L 67/10* (2013.01); *G06F 17/30864* (2013.01); *G06F 9/5083* (2013.01)
USPC ....................................................... 707/773

(58) Field of Classification Search
None
See application file for complete search history.

(56) References Cited

PUBLICATIONS

Abadi et al., "Aurora: a new model and architecture for data stream mangement", 2003, Springer-Verlag, pp. 1-20.*
Kendai, B., et al., "Load Shedding in MavStream: Analysis, Implementation, and Evaluation", Sharing Data, Information and Knowledge, Lecture Notes in Computer Science, Jul. 7, 2008, pp. 100-112, vol. 5071, Springer Berlin Heidelberg, DE.
Park, J., et al., "Semantic Load Shedding for Prioritized Continuous Queries over Data Streams", Computer and Information Sciences—ISCIS 2005, 20th International Symposium, Proceedings, Jan. 1, 2005, pp. 813-822, vol. 3733, Springer Berlin Heidelberg, DE.
Ma, Li., et al., "Semantice Load Shedding over Real-Time Data Streams", International Symposium on Computational Intelligence and Design, Oct. 17, 2008, pp. 465-468, vol. 1, IEEE, Piscataway, US.
Tatbul, N., et al.. "Load Shedding in a Data Stream Manager", Proceedings of the 29th international conference on Very large data bases, Mar. 1, 2003, vol. 29, pp. 309-320, [retrieved on Jun. 10, 2013], retrieved from Internet: http://www.vldb.org/conf/2003/papers/S10P03.

(Continued)

*Primary Examiner* — Hung Q Pham
(74) *Attorney, Agent, or Firm* — Coats & Bennett, PLLC

(57) ABSTRACT

It is presented a method for notifying at least a first condition in an industrial system by means of a monitoring system in order to draw the attention of an operator monitoring the industrial system to the at least one condition. The method comprises displaying (S1) the first condition in a first portion of a display screen of the monitoring system, determining (S2) by means of eye tracking an area where a user focuses on the display screen, the area where the user focuses differing from the first portion, and alerting (S3) the user of the first condition in order to allow the user to be notified of the first condition in the industrial system. A monitoring system is also presented herein.

42 Claims, 8 Drawing Sheets

(56) References Cited

PUBLICATIONS

Jerzak, Z., et al., "Handling Overload in Publish/Subscribe Systems", 26th IEEE International Conference on Distributed Computing Systems Workshops; [retrieved on Jun. 10, 2013], retrieved from Internet: http://scholar.google.com/scholar_url?hl=en&q=http://jerzak.eu/publ/doc/jerzak2006handling.pdf&sa=X&scisig=AAGBfm2E6 EC8E6t_Cf4UEuYT8LpY05j0PQ&oi=scholarr.

Chakravarthy, S., et al., "Stream Data Processing: A Quality of Service Perspective Modeling, Scheduling, Load Shedding, and Complex Event Processing", Advances in Database Systems, vol. 36, Apr. 1, 2009, pp. 1-324, Springer, US.

* cited by examiner

| Sensor identity | Temperature (°C) | Humidity (%) | CO level | Time |
|---|---|---|---|---|
| | | | | |

LOAD SHEDDING IN A DATA STREAM MANAGEMENT SYSTEM

TECHNICAL FIELD

The present invention generally relates to the field of data stream management systems and more specifically to load shedding in data stream management systems.

BACKGROUND

Traditional relational database management systems (DBMSs) have been researched for over thirty years and are used for a wide range of applications. One of their key features is the storage of data as a collection of persistent "relations", often referred to as tables. A relation is defined as a set of tuples that have the same attributes, each tuple representing a data element and the information about that element. In a DBMS, a table (or relation) is organized into rows and columns. Each row of the table represents a tuple and each column represents an attribute common to all tuples (rows).

Another key feature of a DBMS is a set of well-defined operations (or "queries") that can be issued by any DBMS client in order to read, write, delete or modify the stored data. Structured Query Language (SQL) is the most widespread query language for this purpose, although it is often enriched with proprietary add-ons.

The conventional DBMS is also characterised by having highly optimized query processing and transaction management components, as illustrated in FIG. 1. A query from a DBMS client 1 is received by the DBMS 2, parsed by a query parsing unit 3 of the DSMS, and analyzed in order to verify that it is both syntactically and semantically correct. Once this is done, a query plan is generated by the DBMS's query planner 4. A query plan is a set of step-by-step instructions defining how the query is to be executed, whose details depend on how the concrete DBMS is implemented. The query plan aims to optimise, for example, the number of accesses to the physical storage device 5 (e.g. a hard disk) in order to speed up the execution time. Transaction management secures the so-called "ACID" properties (i.e. "Atomicity, Consistency, Isolation and Durability").

Queries that are processed by a traditional DBMS are termed "ad hoc" queries. That is, the query is sent to the DBMS and the response to that query, which is both valid at that specific moment and complete, is sent back. Traditional (ad hoc) queries are typically specified in a particular format, optimized, and evaluated once over a "snapshot" of a database; in other words, over a static view of the data in the database. The stored data which is to be operated on during processing of the query must be stable, i.e. not subject to any other ongoing database transaction since, for example, a high ratio of write queries can harm the performance of the DBMS serving read queries.

However, in recent years, there has emerged another class of data intensive applications (such as those intended for sensor data processing, network management in telecommunications networks and stock trading) that need to process data at a very high input rate. Moreover, these applications need to process data that is typically received continuously over long periods of time in the form of a data stream. As a result, the amount of data to be processed can be unbounded. In principle, stream data could be processed by a traditional database management system, by loading incoming stream data into persistent relations and repeatedly executing the same ad hoc queries over these relations.

However, there are several problems with this approach. Firstly, the storage of stream data, indexing (as needed) and querying would add considerable delay (or latency) in response time, which may not be acceptable to many stream-based applications. At the core of this mismatch is the requirement that data needs to be persisted on a secondary storage device 5, such as a hard disk typically having a high storage capacity and high latency, before it can be accessed and processed by a DBMS 2 implemented in main memory, such as a RAM-based storage device having a lower latency but typically lower storage capacity.

In addition, the above-described "snapshot" approach to evaluating stream data may not always be appropriate since the changes in values over an interval can be important for stream processing applications, for example where the application needs to make a decision based on changes in a monitored temperature.

Furthermore, the inability to specify Quality of Service (QoS) requirements for processing a query (such as latency or response time) to a traditional DBMS makes its usage less acceptable for stream-based applications.

It will therefore be appreciated that the characteristics of the conventional DBMS (i.e. the passive role it plays, the need for standardised query formats and associated predefined query plans, stable data, etc.) make the DBMS unsuitable for serving applications that require the processing of huge amounts of data. An example is an application performing Complex Event Processing (CEP) over a stream of data arriving periodically or continuously, from one or a plurality of data sources (e.g. sensors emitting their measured values, servers sending real-time stock rates, etc.), whose number is unpredictable.

Hence, the techniques developed for DBMSs need to be re-examined to meet the requirements of applications that use stream data. This re-examination has given rise to a paradigm shift along with new approaches and extensions to current techniques for query modelling, optimization, and data processing in order to meet the requirements of an increasing number of stream-based applications. Systems that have been developed to process data streams to meet the needs of stream-based applications are widely known as Data Stream Management Systems (DSMSs).

FIG. 2 shows a DSMS 10 together with a DSMS client 20. Queries for DSMS 10 are also expressed in a standard language similar to SQL (e.g. Continuous Query Language (CQL) and its derivatives) and a query plan is also produced. However, the queries executed in a DSMS are termed "continuous queries" (CQs) and differ from their DBMS counterparts principally by being specified once (commonly via provisioning, e.g. via operation and maintenance interfaces) and then evaluated repeatedly against new data over a specified life span or as long as there is data in the input stream(s) 11. Thus, continuous queries are long-running queries that produce output continuously. The result of executing a CQ is a therefore an output data stream 12, possibly with differing rates and schema as compared to the corresponding input data stream(s). The data items in the input data stream(s) 11 can be regarded as "raw events" while those in the output stream 12, which generally convey more abstract information as a result of the CQ execution, can be regarded as "computed events".

Accordingly, a DSMS is not required to store in a permanent manner all the data from the input streams (although it might store some of the received data in certain cases, at least temporarily, for example whenever historical data is needed). Data is extracted and processed by a DSMS as it is received continuously from the incoming streams, and output streams are produced as a result of the execution of CQs in a substantially continuous manner. Thus, in contrast to the traditional DBMS, a DSMS assumes an active role as long as it does not need to receive a (explicit) read query from a database client for sending some data to the client based on the stream data the DSMS currently holds.

Incoming streams 11 to, and outgoing streams 12 from, the DSMS can be regarded as an unbounded sequence of data items that are usually ordered either explicitly by a time-based reference such as a time stamp, or by the values of one or more data elements (e.g. the packet sequence identifier in an IP session). A data item of a data stream can be regarded as a tuple of a relation. In this context, tuples comprise a known sequence of fields and essentially correspond with application-specific information. Hereinafter, the terms "data item" and "tuple" are used interchangeably.

One example of tuples that can be received by a DSMS within incoming data streams is shown in FIG. 3. In this case, a sensor having a unique ID sends, in a continuous manner (e.g. every second), a measure of the temperature, humidity and CO level of its surroundings. This constitutes a stream of data. A large number of sensors (even hundreds of thousands) can feed a DSMS which can produce one or more output data streams based on the received incoming data streams. For example, the CQ execution by a DSMS over incoming data streams comprising tuples as illustrated in FIG. 3 can produce an output data stream for a certain DSMS client application that contains the sensor identity, CO level and time information, only when the monitored temperature exceeds a certain threshold.

A more typical DSMS deployment is illustrated in FIG. 4, where the DSMS 10 receives data from one or more incoming data streams 11, executes a continuous query against the received data and sends at least some of the received data to a plurality of DSMS clients 20-1 to 20-N. Each DSMS client applies its own application logic to process the received data stream, and triggers one or more actions when the processing results satisfy predetermined criteria (e.g. the values reported by one or more sensors depart from certain pre-determined ranges, or an average value of a monitored variable exceeds a threshold). An action can comprise sending a message to another application server. For example, the DSMS client may issue an instruction for sending an SMS or activating an alarm, or a message towards a certain device to change an operational parameter of the device.

The DSMS 10 and the corresponding client applications 20-1 to 20-N are normally deployed in different nodes. This is done partly for performance reasons, since the QoS assurance mechanisms implemented by the DSMSs (if any), as well as DSMS scheduling policies, would be affected if the DSMS platform also implemented the applications' logic. In this case, the CPU or memory consumption would depend not only on the CQ execution but also on other variables that are unknown or at least difficult to calculate. Another reason for deploying the DSMS and client applications in different nodes is the tendency for commercial DSMSs to be optimized for particular hardware platforms, which are not necessarily optimal for deploying the client applications.

The bursty nature of the incoming stream(s) can prevent DSMSs from maintaining the required tuple processing rate whilst data is received at a high input rate. As a result, a large number of unprocessed or partially processed tuples can become backlogged in the system, causing the tuple processing latency to increase without bound. Due to the predefined QoS requirements of a CQ, query results that violate the QoS requirements may become useless, or even cause major problems as the DSMS client applications could execute wrong or inappropriate actions if they receive outdated data.

One known approach to dealing with such data overload situations is so-called "load shedding". When the DSMS is overloaded with data from the input data stream(s), load shedding is performed, i.e. at least some of the data items (tuples) as received by the DSMS or partially processed by the DSMS are discarded in order to reduce the processing burden of the DSMS in generating the output data stream. In other words, load shedding involves selecting which of the tuples should be discarded, and/or in which phase of the CQ execution the tuple(s) should be dropped. The overload may be caused by an excessively high data input rate or any other situation arising that causes a degradation of the QoS required by a DSMS application, such as a degradation of performance conditions within the DSMS.

In any case, there can be threshold limits that can be pre-defined in the DSMS which, with regard to data rate from the input data stream(s), can establish that a degradation on its Quality of Service performance for accomplishing with CQ execution can occur and, thus, prejudice the production of the corresponding output data stream(s). Accordingly, a DSMS can activate a "load shedding" mechanism when—among other factors that can cause an overload or malfunction on its resources—the data rate from the input data stream(s) exceeds a configured limit, and deactivate it otherwise.

The discarding of tuples from the system during load shedding preferably minimises an error in the result of the CQ execution. Such discarding of tuples is often acceptable as many stream-based applications can tolerate approximate results. However, load shedding poses a number of problems in DSMS systems.

A random load shedder simply sheds tuples at random. Although this kind of shedder is easy to implement, it has the drawback of failing to discriminate between meaningful tuples and those with no impact on the QoS provided to an application.

A semantic shedder, on the other hand, bases its decision on whether to drop a tuple on the tuple's relevance. This requires the DSMS to be configured with a relationship between the "value" of a certain received tuple (i.e. as received from incoming streams) and its relevance for a particular client application, which is determined by a corresponding so-called "utility function". The utility function is a relation between the value of a tuple and the corresponding impact on the system QoS figures (latency, CPU, memory etc.) that are imposed by the DSMS client application. The utility function needs to be entered manually into the DSMS by the DSMS administrator.

In order to use the built-in mechanisms provided by the DSMS (if any), it is necessary to express the requirements (e.g. QoS requirements) of the DSMS's client application(s) with regard to the DSMS output stream(s). Specification of an appropriate utility function is a difficult task in many cases.

Firstly, some DSMS products do not include load shedding support as a built-in function. Even if they do, there are usually numerous clients in a typical practical application of a DSMS, with many clients using differing sets of output data streams. Furthermore, the client application logic might not be known when the DSMS is deployed or configured by the administrator, and can be complex and subject to frequent changes. For example, the logic of a client might also depend on data received by the client other than that received via the DSMS output stream (e.g. configuration variables), and vary with time as the client application is repeatedly updated.

In view of the considerable difficulties summarised above, several different approaches have been taken to adapting a DSMS to reliably and consistently deliver improved QoS to a variety of client applications whilst implementing a load shedding process.

One of these approaches, which is particularly applicable to multi-query processing systems executing CQs with different QoS requirements, has been to improve resource allocation by developing effective scheduling strategies. A number of scheduling strategies have been developed, some more useful for catering for the needs of a particular type of application (in terms of tuple latency, total memory requirement etc.) than others. However, the scheduling problem in a DSMS is a very complex one and efforts are ongoing to develop strategies with reduced scheduling overhead.

A further approach is to deploy several DSMS servers in order to evenly distribute the incoming load among them and avoid congestion situations. However, apart from the increased deployment cost, this solution brings about synchronization and/or configuration issues. For example, since an output stream can be a result of a DSMS processing one or more input streams, devices sending input streams towards the DSMS servers should then be (re)arranged every time a DSMS server is added. Moreover, splitting a CQ execution among several nodes is not a straightforward task (since some operators implementing the CQ execution logic might need to store a sequence of tuples) and might affect the overall QoS figures.

Despite these efforts and others, there still remains a great need to provide an improved DSMS which can reliably deliver improved QoS to a variety of client applications whilst implementing a load shedding process.

SUMMARY

The present inventors have conceived an elegant and highly effective solution to address the above-discussed problems, which lies essentially in adapting the DSMS and its client to interact with one another in a way that allows the DSMS to learn (and therefore subsequently be capable of evaluating) the relevance to the DSMS client of data items which the DSMS has received in its input data stream.

More specifically, the present invention provides in one aspect a data stream processing system, which comprises a data stream management system, DSMS, operable to store data items received via an input data stream in a data store and execute a continuous query against the received data items to generate an output data stream, the DSMS being further operable to execute a load shedding process for discarding some of the data items as received by the DSMS or that have been partially processed by the DSMS. The data stream processing system further comprises a DSMS client arranged to receive and process the output data stream generated by the DSMS, and operable to execute an action when triggered by the processing of one or more data items in the output data stream. The action comprises the sending by the DSMS client of an external signal. The data stream processing system also includes a feedback loop arranged to convey a feedback signal to the DSMS notifying the execution of an action by the DSMS client, and the DSMS is operable to determine at least one rule governing the load shedding process on the basis of received feedback signals and the stored data items.

Thus, it will be appreciated that, in operation, the DSMS receives a feedback signal in response to the DSMS client executing an action upon processing one or more received data items, which have been generated by the DSMS executing a CQ against one or more data items input thereto. The DSMS also stores these one or more received data items and is therefore able to correlate the received feedback signal with the stored data items, and thus determine a rule governing a load shedding process that it implements when necessary. In other words, the received feedback signal is used by the DSMS to learn which data items of the input data streams cause a reaction in the client, so that it can derive classification rules for discarding and/or prioritising some of the data from the incoming data stream, based on the actions performed by the client. Thus, the DSMS may use the received feedback signal to provide differentiated treatment of received data items, discarding and/or partially processing data items that will not (or are unlikely to) cause the execution of an action by the DSMS client. The DSMS is thus able to determine an effective load shedding rule that is applicable for the client, whenever required and without requiring input from a system administrator, much less a system administrator familiar with details of the application logic used by the client.

Accordingly the DSMS may learn that certain data items received by the DSMS via the input stream cause, as a result of the CQ processing by the DSMS, an output stream that triggers the client to take an action (e.g. sending a message to activate an alarm, send an SMS etc.). Then, subsequent data items received by the DSMS in further incoming data stream(s) that fit with the characteristics of those certain data items (e.g. a certain range of measured temperatures, measured values from a certain sensor, and/or certain combined values or value ranges, etc.) could be considered by the DSMS for prioritised processing, the others being discarded or assigned a lower priority for processing, for example.

The present invention further provides a DSMS, comprising: a data store arranged to store data items received an input data stream; a continuous query execution module operable to execute a continuous query against data items received via the input data stream to generate an output data stream; a learning module operable to receive a feedback signal notifying the execution of an action by a client of the DSMS, and determine, using the received feedback signal and stored data items, at least one rule governing a load shedding process for discarding some of the data items as received by the DSMS or that have been partially processed by the DSMS. The action comprises the sending by the DSMS client of an external signal. The DSMS further comprises a load shedding module operable to execute a load shedding process in accordance with the at least one determined rule.

The present invention further provides a DSMS client, comprising: a communication module operable to receive data items in an output data stream generated by a DSMS; a processing module operable to process the received data items in accordance with stored processing logic and execute an action when triggered by the processing of one or more of the received data items, the action comprising the sending by the DSMS client of an external signal; and a feedback signal generator operable to generate a feedback signal notifying the execution of an action by the processing module. The communication module is operable to transmit the generated feedback signal to the DSMS.

The present invention further provides a method of processing stream data in a data stream processing system comprising a DSMS and a DSMS client. The method comprises the DSMS storing data items received via an input data stream in a data store. The DSMS executes a continuous query against the received data items to generate an output data stream. The DSMS client receives and processes the output data stream generated by the DSMS, and executes an action when triggered by the processing of one or more data items in the output data stream, the action comprising the sending by the DSMS client of an external signal. The DSMS is provided with a feedback signal notifying the execution of an action by the DSMS client (140). The DSMS determines, on the basis of received feedback signals and stored data items, at least one rule governing a load shedding process for discarding some of the data items as received by the DSMS or that have been partially processed by the DSMS, and executes the load shedding process in accordance with the at least one determined rule.

The present invention further provides a method of processing stream data in a DSMS. The method comprising the DSMS performing the processes of: receiving data items in an input data stream; storing the received data items in a data store; executing a continuous query against the received data items to generate an output data stream; receiving a feedback signal notifying the execution of an action by a client of the DSMS, the action comprising the sending by the DSMS client of an external signal; determining, on the basis of received feedback signals and the stored data items, at least one rule governing a load shedding process for discarding some of the data items as received by the DSMS or that have been partially processed by the DSMS; and executing the load shedding process in accordance with the at least one determined rule.

The present invention further provides a method of processing stream data in a data stream management system client. The method comprises: receiving data items in an output data stream generated by a DSMS; processing the received data items by a processing module in accordance with stored processing logic and executing an action when triggered by the processing of one of more of the received data items, the action comprising the sending by the DSMS client of an external signal; generating a feedback signal notifying the execution of an action by the processing module; and transmitting the generated feedback signal to the DSMS.

The present invention further provides a computer program product, comprising a computer-readable storage medium or a signal, carrying computer program instructions which, when executed by a processor, cause the processor to perform a method as set out above.

BRIEF DESCRIPTION OF THE DRAWINGS

Embodiments of the invention will now be explained by way of example only, in detail, with reference to the accompanying figures, in which.

DETAILED DESCRIPTION OF EMBODIMENTS

Figure 5:
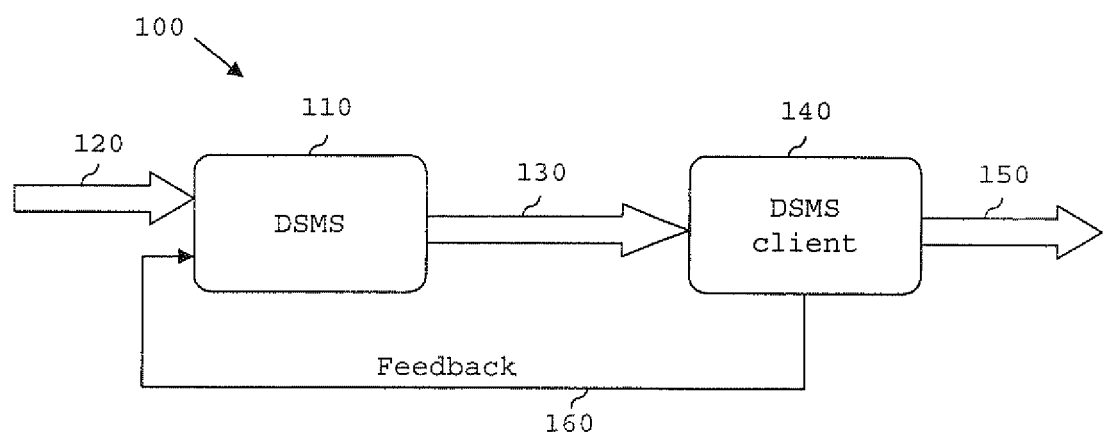
FIG. 5 shows a data stream processing system having a DSMS and a DSMS client, according to an embodiment of the present invention.

FIG. 5 shows a data stream processing system (DSPS) according to an embodiment of the present invention. The DSPS 100 comprises a DSMS 110, which is configured to receive data items from at least one input data stream 120, which provided in the form of a suitably modulated electrical signal. In general, the DSMS 110 may receive a plurality of data streams (at least some which may be multiplexed) over one or more physical channels, which may take any desirable form (e.g. optical fibers, coaxial cables etc.). Furthermore, the input data stream 120 may be irregular and, at times, bursty in nature (such as a local Ethernet traffic stream or an HTTP traffic flow). The data types of attributes in the data stream 120 can be well-structured (e.g. temperature readings), semi-structured (e.g. HTTP log stream), or unstructured (e.g. emails).

The DSMS 110 is operable to execute a continuous query against the received data items to generate at least one output data stream 130. The output data stream 130 is then fed to a DSMS client 140, which processes the received data stream(s) and executes an action 150 when triggered by the processing of one or more data items in the data stream(s) received by the DSMS client 140. In the present embodiment, the action comprises the DSMS client 140 sending an external signal, i.e. transmitting a signal to a recipient different from the DSMS client 140. An action may, for example, comprise the DSMS client transmitting a message to a terminal across a network, for example an update request to a web server over the Internet. Alternatively, the action may comprise the DSMS client creating, deleting or otherwise modifying a record kept therein (e.g. managing a log).

The DSMS client is operable to send a feedback signal to the DSMS 110 via a feedback loop 160. In the present embodiment, the feedback signal differs from the action signal transmitted by the DSMS client in its execution of an action but, as described in more detail below, the feedback signal could alternatively be the same as the action signal. The feedback loop 160 between the DSMS client 140 and the DSMS 110 can be provided by any suitable means, for example via a network such as a LAN or the Internet, or directly, without any intermediary node. Where the DSMS client 140 communicates with the DSMS 110 via a network, the DSMS client may address its feedback messages to the DSMS 110, or to a third party. In the latter case, the messages may be relayed to the DSMS 110 by the third party or fed back by a network sniffer.

In other embodiments, a feedback signal may be provided to the DSMS 110 by defining specific business logic in the server implementing the DSMS client 140, which subscribes the DSMS 110 to the list of recipients of any messages that are transmitted by the DSMS client 140 when triggered to do so by its processing of one or data items in the received data stream 130. In this case, the feedback signal received by the DSMS 110 is the same as the message sent by the DSMS client 140, as its execution of an "action". Thus, the DSMS client 140 need not be reconfigured to make the DSMS 110 a subscriber, and the DSMS 110 may alternatively be notified of the DSMS client's message by a probe (i.e. a network sniffer) that allows the DSMS 110 to receive notification of, and/or information about, any message ("action") issued by the DSMS client 140.

The feedback signal transmitted by the DSMS client 140 via the feedback loop 160 may be received by the DSMS 110 as another input stream, thereby taking advantage of the DSMS's existing data handling infrastructure. However, such additional input stream would need to be handled somewhat differently to the input data steam 120, since it is not subject to CQ execution.

In order to correlate information about the tuples sent by the DSMS 110 to a DSMS client 140 with the loop-back information received by the DSMS 110 with regard to the corresponding "action(s)" performed by a DSMS client 140, a "reference" value is preferably added to the data sent from the DSMS 110 in the generated output data stream(s) 130 towards the DSMS client(s), such that it is usable to identify data items (tuples) received in input data stream that are—at least—temporarily stored by the DSMS for identifying any subsequent "action" of a DSMS client. As will be described further below, such a "reference" is also preferably included by the DSMS client 140 in the message(s) it sends related to said "action(s)". For example, the "reference" can be included by the DSMS client 140 in a message posted to update a web server, in the message sent to activate an alarm, in the message sent to deliver a SMS, etc. The messages sent by a DSMS client 140 as a result of an "action" can be obtained by the DSMS 110 by different means. For example, "sniffing" the messages sent from a DSMS client, or just subscribing the DSMS 110 to receive them as an additional receptor of the message(s) related to the execution of an "action" decided by the DSMS client.

The above-mentioned "reference" is preferably arranged to be unique, at least during a certain period and, as will be explained in the following, preferably comprises a time stamp mark (TSM).

Figure 6:
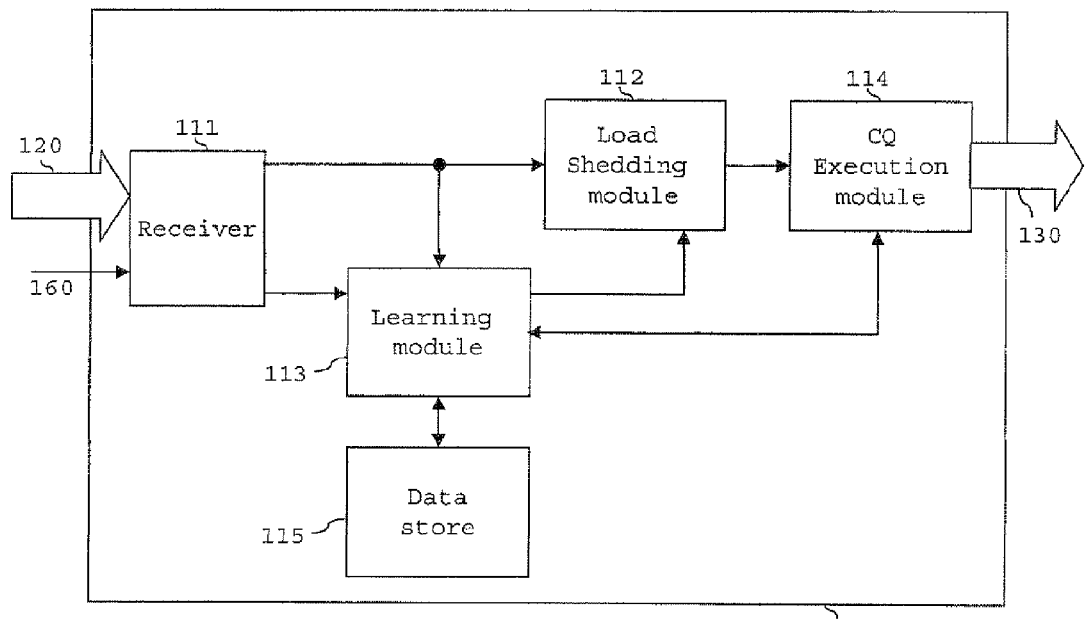
FIG. 6 shows details of the DSMS of the embodiment.

FIG. 6 shows the key features of the DSMS 110 of the present embodiment that are necessary to understand the present invention, with conventional features being omitted for clarity. In this embodiment, the DSMS 110 comprises a DSMS application deployed on a programmable signal processing apparatus, such as a server. The DSMS 110 includes a receiver section 111, a load shedding module 112, a learning module 113, a CQ execution module 114, and a data store 115.

The receiver section 111 interfaces the device(s) sending the data stream(s) 120 to the DSMS 110, with the remaining components of the DSMS 110. The data store 115 may be non-volatile memory such as a magnetic computer storage device (e.g. a hard disk) or a volatile memory such as DRAM or SRAM. In the present embodiment, the load shedding module 112, the learning module 113 and the CQ execution module 114 comprise hardware which implements procedures that may form at least a part of a computer program, module, object or sequence of instructions executable by the programmable signal processing apparatus. These procedures, when executed by the signal processing apparatus, process stream data in a manner which will be described below.

Figure 7:
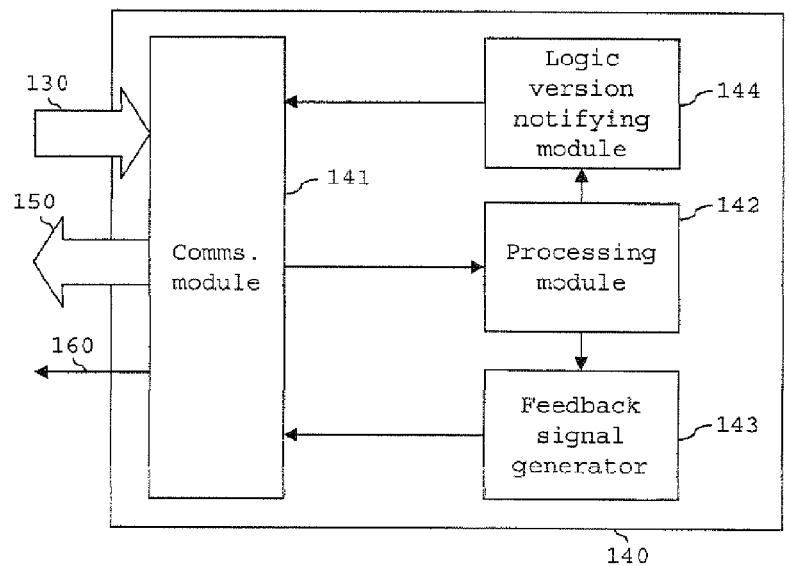
FIG. 7 shows details of the DSMS client of the embodiment.

FIG. 7 shows key features of the DSMS client 140 of the present embodiment. Conventional components which are not necessary for understanding the present invention are not shown, for reasons of clarity. Similar to the DSMS 110 of the present embodiment, the DSMS client 140 comprises a DSMS client application deployed on a programmable signal processing apparatus. As explained above, it is preferable to implement the DSMS and DSMS client on separate hardware platforms, as in the present embodiment. However, the DSMS 110 and one or more DSMS clients 140 may be hosted by a single hardware platform in other embodiments.

The DSMS client 140 comprises a communications module 141, which provides an input/output interface between the remaining components of the DSMS client 140 and the DSMS 110, as well as any other devices that the DSMS client 140 is required to communicate with.

The DSMS client 140 further comprises a processing module 142 as well as a feedback signal generator 143 and a logic version notifying module 144 that are configured to communicate with the processing module 142 and the communications module 141. The processing module 142, the feedback signal generator 143, and the logic version notifying module 144 comprise hardware which implements procedures, which procedures may form at least a part of a computer program, module, object or sequence of instructions executable by the programmable signal processing apparatus of the DSMS client. These procedures, when executed by the client's signal processing apparatus, cause the DSMS client to process stream data in a manner which will be described below.

Figure 8:
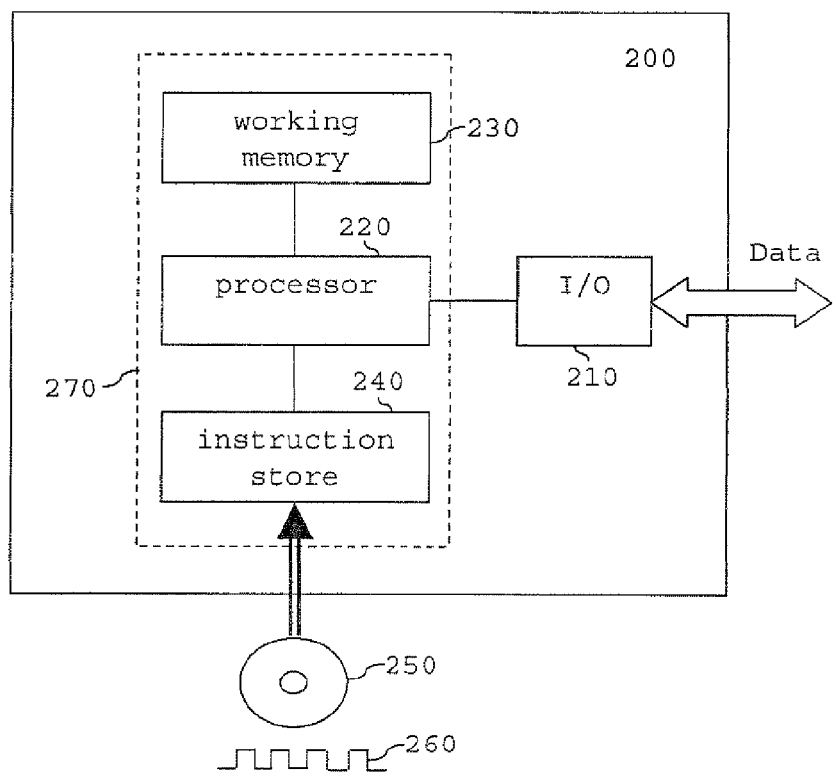
FIG. 8 illustrates an example of computer hardware capable of hosting DSMS and/or DSMS client applications.

An example of a general kind of programmable signal processing apparatus in which one or both of the DSMS and DSMS client applications may be implemented is shown in FIG. 8. The signal processing apparatus 200 shown comprises an input/output section 210, a processor 220, a working memory 230, and an instruction store 240 storing computer-readable instructions which, when executed by the processor 220 cause the processor 220 to perform the processing operations hereinafter described to process stream data in the DSMS 110 or the DSMS client 140.

The instruction store 240 is a data storage device which may comprise a non-volatile memory, for example in the form of a ROM, a magnetic computer storage device (e.g. a hard disk) or an optical disc, which is pre-loaded with the computer-readable instructions. Alternatively, the instruction store 240 may comprise a volatile memory (e.g. DRAM or SRAM), and the computer-readable instructions can be input thereto from a computer program product, such as a computer-readable storage medium 250 (e.g. an optical disc such as a CD-ROM, DVD-ROM etc.) or a computer-readable signal 260 carrying the computer-readable instructions.

The working memory 230 functions to temporarily store data to support the processing operations executed in accordance with the processing logic stored in the instruction store 240. As shown in FIG. 8, the I/O section 210 is arranged to communicate with the processor 220 so as to render the signal processing apparatus 200 capable of processing received signals and communicating its processing results.

In the present embodiment, the combination 270 of the processor 220, working memory 230 and the instruction store 240 (when appropriately programmed by techniques familiar to those skilled in the art) together constitute the load shedding module 112, the learning module 113 and the CQ execution module 114 of the DSMS 110, and/or the processing module 142, the feedback signal generator 143 and the logic version notifying module 144 of the DSMS client 140. The combination 27C also performs the other operations of the DSMS 110 and the DSMS 140 that are described herein.

The operations performed by the DSMS 110 and the DSMS client 140 of the present embodiment to process stream data and implement a dynamic load shedding mechanism will now be described with reference to FIGS. 9 and 10.

Figure 9:
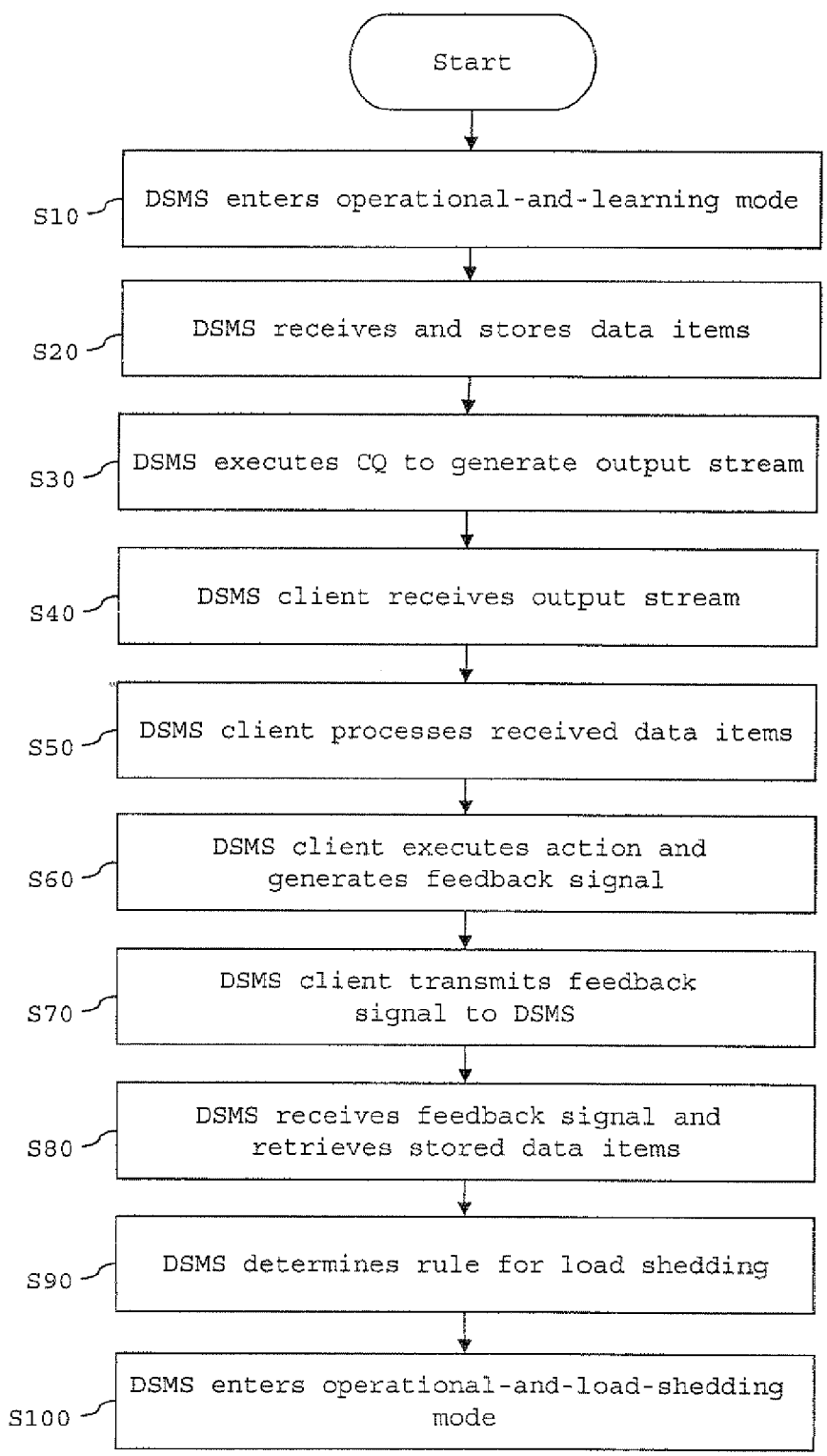
FIG. 9 shows a method of processing data in the data stream processing system of the embodiment.

Referring first to FIG. 9, in step S10, the DSMS 110 begins operating in an operation-and-learning learning mode (also referred to herein as the "learning mode"), during which the CQ execution module 114 executes a CQ against data items from the input stream 120, and the learning module 113 of the DSMS 110 determines at least one rule governing the load shedding process which the load shedding module 112 will implement when the DSMS detects that a threshold level of query processing congestion has been reached or exceeded.

Operation in the learning mode can be instigated by a command from the system administrator, or may be started autonomously by the DSMS 100. The DSMS 110 preferably operates in the learning mode only when it determines that the rate (or an average rate) at which data items are received via the input data stream 120 is sufficiently low (i.e. below a predetermined limit) for the operation of the DSMS 110 in the learning mode to provide substantially no degradation (i.e. no degradation or a level of degradation that does not affect the functionality of the DSMS client) of a QoS figure (in terms of tuple latency, for example) that is required for the continuous query being executed by the CQ execution module 114. In this way, the DSMS 110 can ensure that the execution of the learning process will not impact on the performance of its normal CQ execution.

However, it is preferable for the learning mode to be triggered by the DSMS 110 receiving via the receiver 111 an indication that allows the DSMS 10 to determine that the processing logic used by the DSMS client 140 to process the output data stream 130 has changed, for example as a result of a new client application being installed on the DSMS client 140, or existing software being updated. This is because the new (or updated) DSMS client application may be triggered to execute an action by different data items than the previous application (or the previous version of the application, as the case may be). Accordingly, the learning mode can be triggered within the DSMS, and one or more rules governing a load shedding process therein created and/or updated, when the DSMS 110 detects that the processing logic used by a DSMS client 140 has changed.

Notification of the logic change can be provided in the feedback signal or in a separate signal. For example, in order to automatically trigger operation in the learning mode using the feedback signal, messages fed back to the DSMS 110 can include one or more indicators identifying the DSMS client application and/or the latest "version" of the implemented logic. This data will arrive in the form of a further incoming data stream at the DSMS 110, and undergo processing thereby. For example, if a CEP application "X" within a DSMS client 140 is updated with a new rule and/or updated logic, version-identifying data element(s) issued by the DSMS client 140 in an output message can change e.g. from "CEPX v1" to "CEPX v2"). Accordingly, when the DSMS 110 detects that one of these version indicators has changed (e.g. by comparing received indicators with a reference indicator which indicates the most recent version of the DSMS client logic then known to the DSMS 110), a new learning process can be started by the DSMS 110, at least in respect of the DSMS client 140 whose processing logic has changed. As an alternative to the version indicator, the DSMS client 140 may send a logic change indicator to the DSMS 110 that notifies the DSMS 110 that the processing logic used by the DSMS client 140 has changed, thereby triggering the DSMS 110 to start a classification rule learning process.

In step S20, the receiver 111 receives data items from the input data stream 120 and passes the received data items to CQ execution module 114 via the load shedding module 112 (it is noted that the load shedding module 112 does not operate during the learning mode, at least on the data stream(s) that are being processed to serve the DSMS client 140 which the learning process concerns). Furthermore, the learning module 113 monitors the data items received from the input data stream 120 and keeps a record of the received data items, by storing a copy of each received data item (hereafter also referred to as a tuple) in the data store 115.

In step S30, the CQ execution module 114 receives the tuples from the receiver 111. The CQ execution module 114 executes a CQ against sets of one or more tuples in the input data stream 120 to generate a corresponding output tuple in the output data stream 130 for each of these sets. The output tuple is then transmitted to the DSMS client 140. Although a single output data stream 130 is generated and transmitted to the DSMS client 140 in the present embodiment, two or more output data streams may be generated and transmitted in other embodiments, each output stream being based on one or more input data streams that may or may not also form the basis of another output data stream.

In many practical applications, tuples will arrive at the DSMS 110 over several streams and at high rates. To be capable of performing the learning process herein described effectively under such circumstances, the DSMS 110 is preferably arranged, as in the present embodiment, to be capable of identifying tuples received from the input stream 120 by use of tuple identifiers that can uniquely identify respective tuples, at least over a certain time period. The identifiers may, for example, be packet sequence identifiers in the case of an IP session, or a time-based reference such as a time stamp mark (TSM), for example. The identifiers may be provided by the source generating the input data stream 120, another device upstream of the DSMS 110 that relays the data stream 120 to the DSMS 110, or by the DSMS 110 itself.

In the present embodiment, no TSMs are present in the input data stream 120, and a component of the DSMS 110 (namely the receiver 111 in the present embodiment) generates a TSM upon receiving the tuple and associates the generated TSM with the tuple. By associating the generated TSM with the tuple, the receiver 111 establishes a relationship that allows the DSMS 110 to identify the tuple when provided with the corresponding TSM. In the present embodiment, the association is made by the receiver 111 storing the TSM in the data store 115, in association with the corresponding tuple copy (or set of tuples to which the corresponding tuple belongs) in a data structure, such as a table.

However, in cases where the tuples from the input data stream 120 already include an identifier such as a TSM, a component of the DSMS 110 (e.g. the receiver 111) preferably reads a TSM from at least one tuple in each set of tuples that the CQ execution module 114 processes.

After executing the CQ against a received set of one more tuples, the QC execution module 114 preferably inserts into the output data stream 130, in association with each of the output tuples in the output data stream 130, a second identifier that allows one or more of the tuples in the corresponding set of tuples in the input data stream 120 to be identified. In the present embodiment, the second TSM is inserted into a field of the output tuple, although it may otherwise be provided in the output data stream 130 in association with the output tuple (e.g. as part of a tuple header). In the present embodiment, the second TSM is the same as the TSM read from, or associated with, the tuple of the input set of one or more tuples on whose processing by the CQ execution module 114 the output tuple is based. Some CQ operators operate over a set of input data (e.g. received within a certain time window), for example an operator calculating the average value of the tuples received in the last minute. In such cases, the second TMS that is inserted into the output data stream 130 comprises the TSM belonging to one of the tuples (e.g. the latest tuple) of the corresponding set of tuples from the input data stream 120.

It should be noted, however, the two TSMs need not be the same, and the DSMS 110 may generate the second TSM independently of the first TSM upon creating the output tuple as a result of the CQ execution. In this case, the CQ execution module 114 communicates this second identifier to the learning module 113, which stores the identifier in the data store 115 in association with the one or more tuples in the corresponding set of tuples in the input data stream on the basis of the (predetermined or measured) period of time that elapsed between the first TSM being read (or generated) and the second TSM being generated, for example.

The insertion of TSMs into the output data stream 130 can also be useful for assessing query latencies and other QoS figures relating to the CQ execution module 114. As a result of the time stamping process described above, the received tuples ($t_1$ (field$_1$, field$_2$, . . . , field$_n$) become ($t_1$ (field$_1$, field$_2$, . . . , field$_n$, TSM), where TSM stands for the respective time stamp mark set by the system. This TSM is handled by the CQ operators implementing the CQ execution logic as one more tuple fields.

In step S40, the DSMS client 140 receives via its communications module 141 the tuples in the output data stream 130 that have been generated by the DSMS 110. In the present embodiment, the DSMS client 140 also received the TSMs that have been inserted into the output data stream 130 in association with the tuples of the output data stream 130.

In step S50, the processing module 142 of the DSMS client 140 processes the received tuples in accordance with its stored processing logic. While doing so, the processing module 142 may be triggered by the processing of one or more of the received tuples (e.g. a tuple bearing a value in one of its fields that satisfies a prescribed condition, or the average of such values taken over two or more tuples satisfying a predefined condition, such as exceeding a threshold) to execute one of a number of actions 150. Such actions may comprise, for example, issuing an instruction for sending an SMS or activating an alarm, or issuing a message towards a certain device to change an operational parameter of the device. For example, the DSMS client 140 could raise an alarm if one of the values of a sensor temperature that are contained in the received tuples exceeds a threshold, meaning that a fire is likely to have started. The DSMS client 140 could also send an SMS requesting a maintenance call-out when the temperature averaged over a certain time interval is below another threshold, indicating that the sensor may have developed a fault. In the present embodiment, the external signal sent by the DSMS client 140 in its execution of an action is generated and sent by the feedback signal generator 143.

When the criteria for executing an action 150 have been met, then in step S60 the processing module 142 of the DSMS client 140 instructs the feedback signal generator 143 to generate a feedback signal which is to be fed back to the DSMS 110. In the present embodiment, the feedback signal includes the TSM associated with the tuple in the received data stream 130 whose processing triggered the execution of the action 150 or, where the action 150 was triggered by the processing of more than one tuple, at least one of the TSMs associated with those tuples (e.g. the first or the last in the sequence of these tuples).

Figure 10:
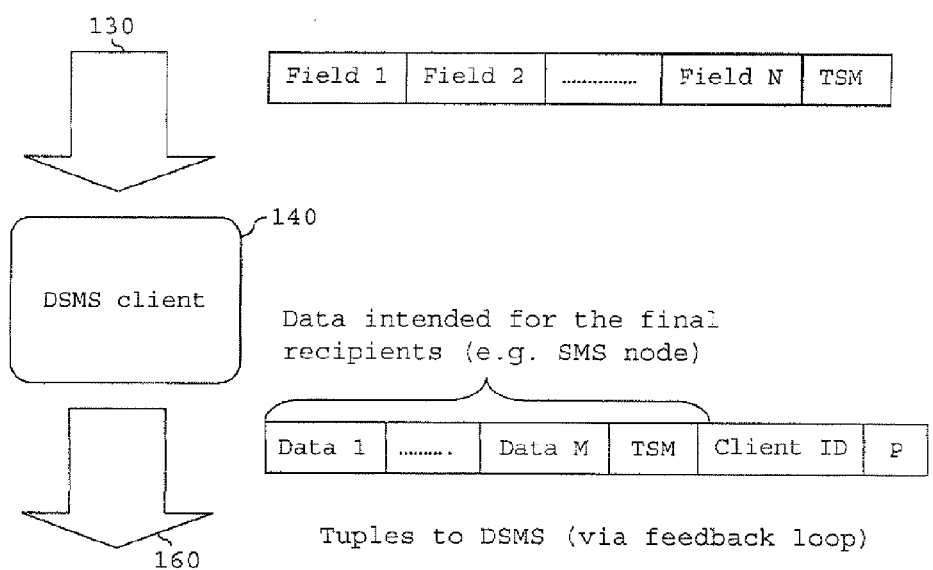
FIG. 10 shows an example of tuples received and output by the DSMS client of the embodiment.

More specifically, as shown in FIG. 10, declarative statements are used in the present embodiment to configure the DSMS client 140 so that tuples comprising a TSM and an application identifier ("Client ID") are included within messages output by the DSMS client 140.

Although not generally required, the feedback signal generator 143 of the present embodiment also includes in the feedback signal which it generates a priority value ("P") associated with the action executed, as also shown in FIG. 10. The priority value P provides a measure of the importance of the action executed relative to that of one or more other actions that may be executed by the DSMS client 140. Referring again to the temperature sensor example above, the priority value associated with the action that comprises raising a fire alarm can be greater than the priority value associated with the action that comprises sending a maintenance call-out request. Priority values can comprise numeric values, wherein e.g. the higher the value is, the higher the relevance of the executed action(s) is.

Therefore, one or more load shedding processing rules in the DSMS 110 can be adapted and/or created based also on priority information ("P") received from a DSMS client 140. Accordingly, e.g. in case the DSMS is overloaded and a load shedding process should be executed, certain data items from input data streams (120)—for which an earlier CQ processing on similar data items resulted in an output data stream that caused the DSMS client 140 to execute an "action" with an indicated high priority—are considered therein for prioritized CQ processing, and the others being either assigned a lower priority for CQ processing, or discarded (e.g. even though the load shedding processing rule indicates they can cause an "action" in the DSMS client). In other words, in case of a load shedding process run by the DSMS 110, one or more rules governing said process can be created, or adapted, according to priority information values ("P") received from DSMS client(s), so that e.g. only data items of incoming data streams that have been learnt to trigger "actions" with high priority values in a DSMS client 140 are considered for CQ processing.

In step S70, the feedback signal generated by the feedback signal generator 143 is transmitted to the DSMS 110 by the communications module 141 via the feedback loop 160. As noted above, the DSMS client 140 is generally not required to send the feedback signal directly to the DSMS 110 and, where the DSMS 110 and its client 140 are connected via a network, the DSSM client 140 need not address the feedback signal to the DSMS 110. In the latter case, the message transmitted by the DSMS client 140 by way of its normal execution of an action may be picked up by a network sniffer and provided thereby as the feedback signal to the DSMS 110. Thus the feedback signal and the external signal may be one and the same.

In step S80, the DSMS 110 is provided, via the feedback loop 160, with the feedback signal including the TSM associated with the tuple in the output data stream 130 whose processing triggered the execution of the action. The feedback signal may be received at the DSMS 110 via a dedicated interface or, as in the present embodiment, as another input stream at the receiver 111 of the DSMS 110. Since this stream is not subject to CQ execution, it is handled differently by the DSMS 110. More particularly, in response to the received feedback signal, the learning module 113 retrieves from data store 115 the stored tuple which has a TSM associated with it that corresponds to that in the feedback signal. The feedback signal and the tuples retrieved from the data store 115 are then arranged chronologically by the DSMS 110. Thus, an ordered set of tuples is received by the learning module 113, for example:

$T_1$ (field$_1$, field$_2$, . . . , field$_n$, TSM$_1$), $T_2$(field$_1$, field$_2$, . . . , field$_n$, TSM), Action$_1$ (ID$_1$, TSM$_2$, P$_1$), $T_3$ (field$_1$, field$_2$, . . . , field$_r$, TSM$_4$), Action$_2$ (ID$_2$, TSM$_4$, P$_2$) . . . .

In the sequence above, $T_i$ stands for the tuples received in the DSMS 110 via the incoming stream(s) 120, Action$_i$ stands for the tuples received by the DSMS 110 from the DSMS client 140 (i.e. the feedback signals), and $P_i$ represents the priority value associated with Action$_i$.

In step S90, the learning module 113 of the DSMS 110 determines, on the basis of received feedback signals and the corresponding input tuples retrieved from the data store 115, at least one rule governing the load shedding process to be executed when the DSMS 110 is overloaded with data from the input data stream 120.

During the learning process, the tuples are used by the learning module 113 of the DSMS 110 to determine the rules that relate values of the incoming tuples with the corresponding actions issued by the client application(s). In this process, the learning module 113 can use well-known "supervised learning" algorithms that allow detecting patterns in the contents of certain data streams, and/or to infer correlation functions based on those contents. Currently, supervised learning algorithms are used to detect underlying services based on contents of data streams (e.g. a Voice-Over-IP communication session, a Peer-to-Peer communication session, etc). Teachings based on these kinds of algorithms can thus be used to analyse and correlate the stream contents for the purposes described herein.

Figure 1:
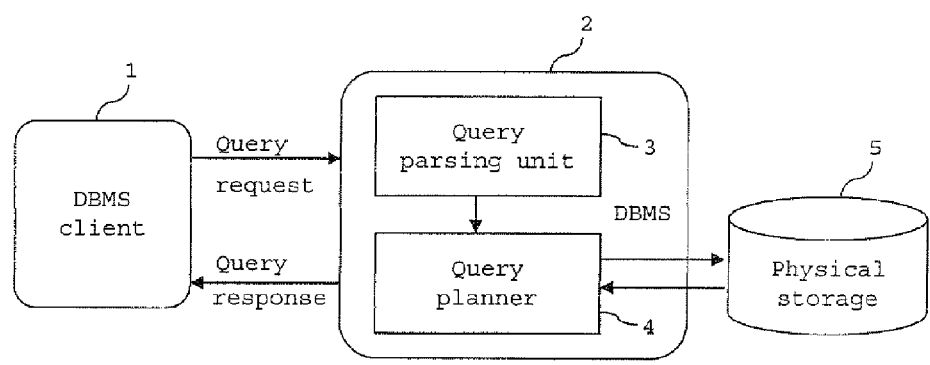
FIG. 1 illustrates the interaction in a conventional system between a DBMS client, a DBMS and a storage device of the DBMS.
Figures 2, 3:
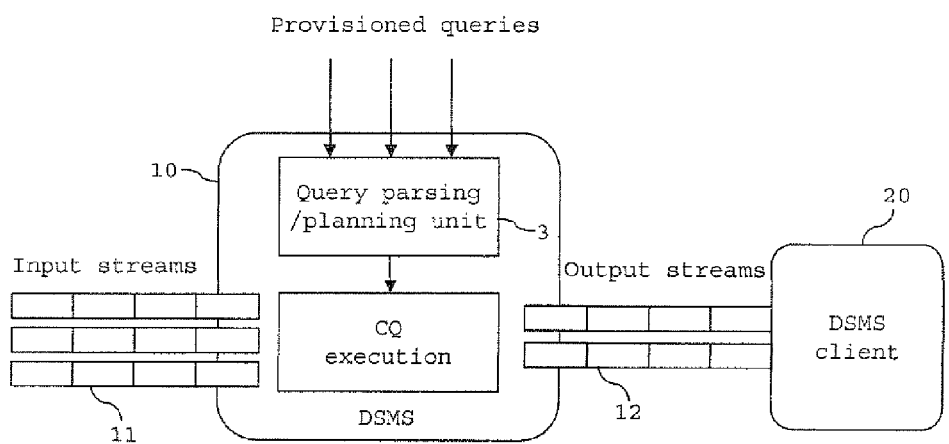
FIG. 2 shows a conventional DSMS serving a DSMS client.
FIG. 3 shows an example of a tuple structure in a data stream.
Figure 4:
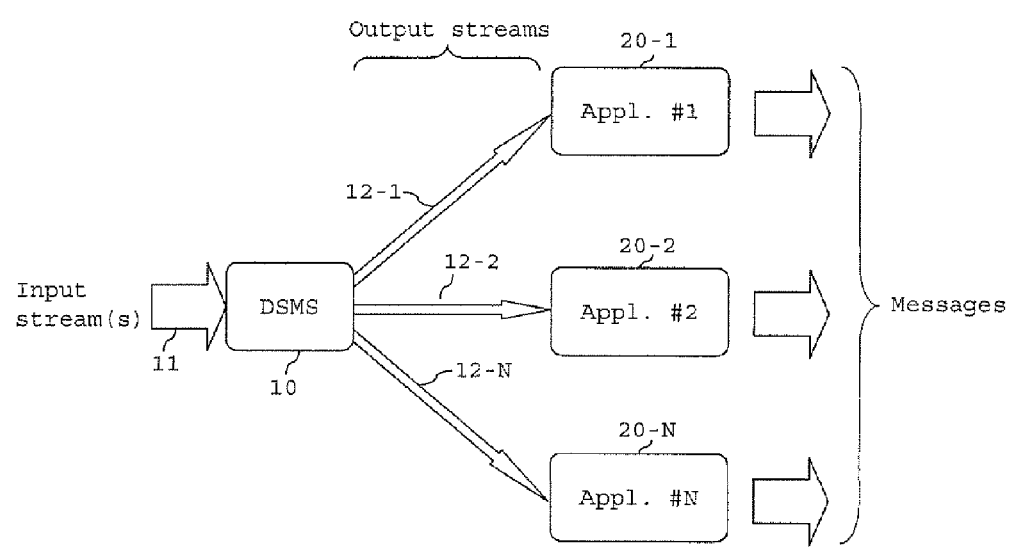
FIG. 4 shows a conventional DSMS serving a number of DSMS client applications.

As a result of the learning process, a relation (rule) between a set of incoming tuples (with the corresponding values) and the corresponding triggered actions is detected. Using as an example a tuple structure as the one illustrated in FIG. 3, a relational function as the one illustrated below can be detected by the learning module 113:

$T_1$ (field$_1$='*', field$_2$>50, field$_3$<40), $T_2$ (field$_1$='*', field$_4$>20)→Action$_1$ (ID$_1$)

The above function is interpreted as follows: if two consecutive tuples (regardless of the sensor identity) report a temperature higher than 50° C. and a relative humidity lower than 40%, followed by another measurement reporting CO levels higher than 20, then an action is triggered in the DSMS client application whose identity is ID$_1$.

In the present embodiment, the learning module 113 is operable to receive a priority value associated with an action executed by the DSMS client 140, and adapt or create a rule governing the load shedding process on the basis of the received priority value. In particular, the learning module 113 is operable to determine a plurality of rules to be used during the load shedding process. For each of these rules that are associated with the DSMS client application, the learning module 113 uses the associated priority value which it has received to assign a probability with which that rule is to be applied during the load shedding process. In this way, the DSMS 110 is able to preferentially apply rules associated with high-priority actions (e.g. raising of a fire alarm) during the load shedding process, and thereby avoid the discarding of input tuples that might otherwise occur as a result of applying a rule associated with a low-priority action (e.g. summoning a maintenance engineer). The use of priority values thus improves the reliability with which higher-priority actions can be executed.

The data processing operations conducted in the operation-and-learning mode as described above preferably continue until one or more rules to be used in the load shedding process have been established, and while the rate of receiving data via the input data stream 120 is sufficiently low for the operation of the DSMS 110 in the learning mode to provide substantially no degradation of a QoS figure that is required for the continuous queries being executed. In order to optimize the usage of processing resources within the DSMS 110, the DSMS 110 may stop processing tuples received via the feedback loop 160 once the learning process ends with regard to a certain application. After operation in the learning mode ends, the process proceeds to step S100.

In step S100, the DSMS 110 operates in the operational-and-load-shedding mode, performing the load shedding process when overloaded with data from the input data stream 120 in accordance with the rule(s) determined during the learning mode. In order to be able to judge whether perform load shedding, and how much of the load needs to be shed, the DSMS 110 makes use of a system load estimation process performed by the load shedding module 112 to estimate the computation load based on current input rates of the data stream(s) and characteristics of active continuous query (or queries). Upon detecting excessive query processing congestion, the DSMS 110 uses the load shedding module 112 to compute the optimal placement of load shedders that minimises the error introduced and to otherwise configure the load shedding process. Various approaches to detecting query processing congestion and optimising the placement of load shedders along operator paths will be familiar to those skilled in the art, such that a further explanation is unnecessary here.

As noted previously, the DSMS 110 may revert to operating in the learning mode when it detects that the processing logic employed by the DSMS client 140 to process the output data stream 130 has changed, such that the rules which it has established for the previous version of the DSMS client application (or a pre-existing client application) may no longer be valid. As shown in FIG. 7, the DSMS client 140 preferably therefore includes a logic version notifying module 144 operable to determine a change in the processing logic used by the processing module 142 to process the tuples received via the DSMS's output stream 130. The determination may be made by the DSMS being informed of the change by the DSMS client's administrator or determined autonomously by its operating system, for example. After determining a change in the processing logic, the logic version notifying module 144 generates and transmits to the DSMS 110, via the communications module 141, an indicator indicating the version of the processing logic currently employed by the DSMS client 140 to process data in the output stream 130. Upon receiving the version indicator, the DSMS 110 detects whether the processing logic has changed and, if so, triggers operation of the learning module and the above-described learning process is repeated to determine one or more load shedding rules applicable for the changed DSMS client processing logic.

In order to automatically trigger operation in the learning mode, messages fed back to the DSMS 110 by the DSMS client 140 may include one or more indicators identifying the DSMS client application and/or the latest "version" of the implemented logic. This may be done by inserting such information into an additional field in the tuples transmitted by the DSMS client 140 to the DSMS 110, or by transmitting such information to the DSMS 110 via a different channel.

During the load shedding process, the DSMS 110 selects which tuples of incoming stream(s) 120 should be discarded before or during CQ execution. As described earlier, this process can be triggered in the DSMS 110 when the data rate in the incoming stream(s) 120 exceeds a certain limit that can prevent the normal performance of the CQ execution process. The process steps performed by the load shedding module 112 of the DSMS 110 during the load shedding process will now be described.

Firstly, the input data stream 120 is received in DSMS 110. The same considerations as described earlier for the learning process apply. Most DSMS implementations allow system programmers to define operators for processing the data in the incoming streams (e.g. by means of either a standard language, such as Java, or a proprietary one) in the same way as the operators used in a normal CQ execution. The load shedding module 112 depicted in FIG. 6 may be implemented using this technique.

Incoming tuples are then evaluated by the load shedding module 112. The logic is as follows: If the DSMS load is below a predefined threshold, then the load shedding module 112 is inactive and the DSMS proceeds with the CQ execution (i.e. tuples extracted from incoming data stream(s) 120 are processed by the CQ execution module 114, and the corresponding output stream(s) 130 is/are produced and sent towards the DSMS client 140. The load shedding module 112 may obtain information about the current system load via information available from the operating system.

If the system load is higher than the threshold then the received tuple is classified by the load shedding module 112. Depending on the result of this classification, the tuple will either be discarded or processed normally. The following logic is applied in the classification process: If the received tuple does not belong to any discovered rule (that is, no action is triggered by this tuple), then the tuple is discarded. Otherwise, if the received tuple fits a discovered rule(s) then, the tuple is retained for further processing. It is assumed that the CPU load required for the tuple processing does not depend on the tuple values: that is, the every incoming tuple goes through the same set of operators. Therefore, it is assumed that the tuple CPU consumption is a variable that should not be considered in the load shedding mechanism.

Optionally, the rule priority (and the corresponding drop probability) can be checked. In case there are several possible actions with different priorities, the one with higher priority is considered. Subject to memory constraints, the tuples received from the input data stream 120 are preferably buffered until all possible triggered actions have been executed by the DSMS client 140.

For example, the following learned sequence may be encountered (to continue with the example described earlier): $T_1$ (field$_1$='*', field$_2$>50, field$_3$<40), $T_2$(field$_1$='*', field$_4$>20)→Action$_1$ (ID$_1$)

If a tuple from an incoming stream matches $T_1$ and/or $T_2$ learned criteria, it can be determined by the load shedding module 112 that an "action" might be executed by the receiving DSMS client (e.g. "Action$_1$" in the example above). Accordingly, the received tuple can be forwarded for processing by the CQ execution module 114, even though the DSMS 110 is overloaded to an extent. Otherwise, the incoming tuple can be discarded from CQ processing.

MODIFICATIONS AND VARIATIONS

Many modifications and variations can be made to the embodiment described above.

For example, in the embodiment described above the load shedding module 112, the learning module 113 and the CQ execution module 114 of the DSMS 110, as well as the processing module 142, the feedback signal generator 143 and a logic version notifying module 144 of the DSMS client 140, are each provided using programmable processing apparatus 200 having a processor 220 which provides the respective functions of these components by executing software instructions stored in instructions store 240. However, it will be appreciated that each or all of the aforementioned components may be implemented in dedicated hardware.

The load shedding module 112 has been described as a separate module that precedes the CQ execution module 114 in the stream data processing path. However, those skilled in the art will appreciate that other arrangements are possible. For example, the functionality of the load shedding module 112 may be incorporated into the CQ execution module 114, such that tuples are shed in accordance with the learned rule(s) at a stage of the query plan other than its beginning.

Although the DSMS 110 of the above embodiment is configured to insert into the output data stream 130 an identifier (in particular, a TSM) that allows one or more of the tuples in the corresponding set of tuples in the input data stream 120 to be identified, and the DSMS client 140 is arranged to feed this identifier back to the DSMS 110 for the purpose of enabling the DSMS 110 to determine the necessary load shedding rule(s), the DSMS 110 and the DSMS client 140 may be configured otherwise. For example, in some applications, input tuples to the data stream processing system 100 may be processed on a tuple-by-tuple basis such that the DSMS client 140 is provided with an opportunity to feed an indication that an action has been executed back to the DSMS 110 (and thereby allow the learning module 113 to learn about the response of the system to that tuple) before the next tuple is processed by the DSMS 110.

The invention claimed is:

1. A data stream processing system, comprising:
a data stream management system (DSMS) comprising:
  a data store comprising a first memory arranged to store data items received via an input data stream in a data store; and
  a first processor comprising:
    a continuous query execution circuit configured to execute a continuous query against the received data items to generate an output data stream comprising one or more data items; and
    a load shedding circuit configured to execute a load shedding process for discarding some of the data items as received by the DSMS or that have been partially processed by the DSMS;
a DSMS client comprising a second processor and a second memory, the second processor comprising:
  a communication circuit configured to receive and process the one or more data items in the output data stream generated by the DSMS; and
  a processing circuit configured to execute an action when triggered by the processing of the one or more data items in the output data stream, the action comprising sending a signal, by the DSMS client, to a recipient different from the DSMS client; and
a feedback loop arranged to convey a feedback signal to the DSMS notifying the execution of the action by the DSMS client;
wherein the DSMS is further configured to determine at least one rule governing the load shedding process on the basis of the received feedback signal and the stored data items.

2. The data stream processing system of claim 1, wherein:
the continuous query execution circuit is further configured to:
  execute, for each of a plurality of sets of the one or more data items in the input data stream, a continuous query against the one or more data items in the set to generate a corresponding set of one or more output data items in the output data stream; and
  insert into the output data stream, in association with each of the corresponding sets of output data items in the output data stream, an identifier which allows one or more of the data items in the corresponding set of data items in the input data stream to be identified;
wherein the data store is configured to store the sets of one or more data items received via the input data stream and the identifiers;
the DSMS client and the feedback loop are further configured to feed back to the DSMS the identifier associated with at least one data item in the output data stream whose processing by the DSMS client triggered the execution of the action; and the DSMS further comprises a learning circuit configured to identify stored data items to be used to determine the at least one rule governing the load shedding process on the basis of the identifiers fed back via the feedback loop.

3. The data stream processing system of claim 2, wherein:
the continuous query execution circuit is further configured to:
read from, or associate with, a data item in each set of the one or more data items in the input stream a corresponding time-based reference; and
insert into the output data stream, as the identifier associated with each of the output data items in the output data stream, the time-based reference read from or associated with the data item in the set used to generate the output data item;
the DSMS client and the feedback loop are further configured to feed back to the DSMS the time-based reference from the received output stream associated with a data item in the output data stream whose processing by the DSMS client triggered the execution of the action by the DSMS client; and
the learning circuit is further configured to identify stored data items to be used to determine the at least one rule governing the load shedding process on the basis of time-based references received via the feedback loop.

4. The data stream processing system of claim 1:
wherein the DSMS client and the feedback loop are further configured to feed back to the DSMS a priority value associated with the action executed by the DSMS client; and
wherein the DSMS further comprises a learning circuit configured to adapt or create a rule governing the load shedding process on the basis of the priority value.

5. The data stream processing system of claim 1, wherein the DSMS is configured:
in an operational-and-learning mode, to execute the continuous query against data items received via the input data stream, and to determine the at least one rule governing the load shedding process on the basis of the received feedback signal when the data rate from the input data stream is below a certain limit that provides substantially no degradation of a Quality-of-Service figure that is required for the continuous query being executed by the DSMS; and
in an operational-and-load-shedding mode, to perform the load shedding process when the data rate from the input data stream exceeds the certain limit, the load shedding process being performed in accordance with the at least one rule determined during the operational-and-learning mode.

6. The data stream processing system of claim 5:
wherein the DSMS client and the feedback loop are further configured to feed back to the DSMS an indicator indicative of a version of processing logic used by the DSMS client to process the output data stream; and
wherein the DSMS is further configured to detect a change in the processing logic used by the DSMS client on the basis of the received indicator and begin operating in the operational-and-learning mode upon detecting that the processing logic used by the DSMS client has changed.

7. The data stream processing system of claim 1, wherein the feedback loop is arranged to provide to the DSMS as the feedback signal the signal sent by the DSMS client in execution of the action.

8. A data stream management system (DSMS) comprising:
a data store comprising a memory arranged to store data items received via an input data stream;
a processor comprising:
a continuous query execution circuit configured to execute a continuous query against data items received via the input data stream to generate an output data stream;
a learning circuit configured to receive a feedback signal notifying the execution of an action by a client of the DSMS, and determine, using the received feedback signal and stored data items, at least one rule governing a load shedding process for discarding some of the data items as received by the DSMS or that have been partially processed by the DSMS, wherein the action comprises sending a signal, by the DSMS client, to a recipient different from the DSMS client; and
a load shedding circuit configured to execute the load shedding process in accordance with the at least one determined rule.

9. The data stream management system of claim 8, wherein:
the continuous query execution circuit is configured to:
execute, for each of a plurality of sets of the one or more data items in the input data stream, the continuous query against the one or more data items in the set to generate a corresponding set of one or more output data items in the output data stream; and
insert into the output data stream, in association with each of the corresponding sets of output data items in the output data stream, an identifier which allows one or more of the data items in the corresponding set of data items in the input data stream to be identified;
wherein the data store is configured to store the sets of one or more data items received via the input data stream and the identifiers; and
the learning circuit is configured to:
receive, as the feedback signal, the identifier associated with at least one data item in the output data stream whose processing by the DSMS client triggered the execution of the action; and
identify the stored data items to be used to determine the at least one rule governing the load shedding process on the basis of the identifiers fed back thereto.

10. The data stream management system of claim 9, wherein:
the continuous query execution circuit is configured to insert into the output data stream, as each of the identifiers, a time-based reference read from or associated with the data item in the set of data items in the input stream used to generate the output data item with which the identifier is associated; and
the learning circuit is configured to:
receive, as the feedback signal, the time-based reference associated with the data item in the output data stream whose processing by the DSMS client triggered the execution of the action by the DSMS client; and
identify stored data items to be used to determine the at least one rule governing the load shedding process on the basis of received time-based references.

11. The data stream management system of claim 8, wherein the learning circuit is configured to:
receive a priority value associated with the action executed by the DSMS client; and
adapt or create the rule governing the load shedding process on the basis of the received priority value.

12. The data stream management system of claim 8, wherein the DSMS is configured:

in an operational-and-learning mode, to execute the continuous query against data items received via the input data stream, and to determine the at least one rule governing the load shedding process on the basis of the received feedback signals when the data rate from the input data stream is below a certain limit that provides substantially no degradation of a Quality-of-Service figure that is required for the continuous query being executed by the DSMS; and in an operational-and-load-shedding mode, to perform the load shedding process when the data rate from the input data stream exceeds the certain limit, the load shedding process being performed in accordance with the at least one rule determined during the operational-and-learning mode.

13. The data stream management system of claim 12, wherein the DSMS is configured to:

receive an indicator indicative of a version of processing logic used by the DSMS client to process the output data stream;

detect a change in the processing logic used by the DSMS client on the basis of the received indicator; and begin operating in the operational-and-learning mode upon detecting that the processing logic has changed.

14. The data stream management system of claim 8, wherein the learning circuit is configured to receive, as the feedback signal, the signal sent by the DSMS client in execution of the action.

15. A data stream management system client, comprising a processor and a memory, the processor comprising:

a communication circuit configured to receive one or more data items in an output data stream generated by a data stream management system (DSMS);

a processing circuit configured to process the received data items in accordance with stored processing logic and execute an action when triggered by the processing of one or more of the received data items, the action comprising sending a signal, by the DSMS client, to a recipient different from the DSMS client; and a feedback signal generation circuit configured to generate a feedback signal notifying the execution of an action by the processing circuit;

wherein the communication circuit is configured to transmit the generated feedback signal to the DSMS.

16. The data stream management system client of claim 15, wherein:

the communication circuit is configured to receive identifiers in the received output data stream, each identifier being associated with a corresponding data item in the output data stream; and the feedback signal generation circuit is configured to generate the feedback signal comprising the identifier associated with at least one data item in the received output data stream.

17. The data stream management system client of claim 16, wherein the identifiers in the received data stream are time-based references.

18. The data stream management system client of claim 15, wherein the feedback signal generation circuit is configured to generate the feedback signal comprising a priority value associated with the action executed by the processing module.

19. The data stream management system client of claim 15, further comprising a logic version notifying circuit configured to generate and transmit to the DSMS an indicator indicative of a version of the processing logic used by the DSMS client to process the output data stream.

20. The data stream management system client of claim 15, wherein the feedback signal generation circuit is configured to generate, as the feedback signal, the signal sent by the DSMS client in execution of the action.

21. A method of processing stream data in a data stream processing system comprising a data stream management system (DSMS) and a DSMS client, the method comprising:

the DSMS storing data items received via an input data stream in a data store;

the DSMS executing a continuous query against the received data items to generate an output data stream comprising one or more data items;

the DSMS client receiving and processing the one or more data items in the output data stream generated by the DSMS, and executing an action when triggered by the processing of the one or more data items in the output data stream, the action comprising sending a signal, by the DSMS client, to a recipient different from the DSMS client;

the DSMS being provided with a feedback signal notifying the execution of the action by the DSMS client;

the DSMS determining, on the basis of the provided feedback signal and stored data items, at least one rule governing a load shedding process for discarding some of the data items as received by the DSMS or that have been partially processed by the DSMS; and the DSMS executing the load shedding process in accordance with the at least one determined rule.

22. The method of claim 21, further comprising:

the DSMS executing, for each of a plurality of sets of the one or more data items in the input data stream, the continuous query against the one or more data items in the set to generate a corresponding set of one or more output data items in the output data stream;

the DSMS inserting into the output data stream, in association with each of the corresponding sets of output data items in the output data stream, an identifier which allows one or more of the data items in the corresponding set of data items in the input data stream to be identified;

the DSMS storing the sets of one or more data items received via the input data stream and the identifiers;

the DSMS client feeding back to the DSMS the identifier associated with the at least one data item in the output data stream whose processing by the DSMS client triggered the execution of the action; and the DSMS identifying stored data items to be used to determine the at least one rule governing the load shedding process on the basis of identifiers which have been fed back by the DSMS client.

23. The method of claim 22, wherein:

the DSMS reading from, or associating with, a data item in each set of the one or more data items in the input data stream a corresponding time-based reference;

the DSMS inserting into the output data stream, as the identifier associated with each of the output data items in the output data stream, the time-based reference read from or associated with the data item in the set used to generate the output data item;

the DSMS client feeding back to the DSMS the time-based reference associated with a data item in the output data stream whose processing by the DSMS client triggered the execution of the action by the DSMS client; and the DSMS identifying stored data items to be used to determine the at least one rule governing the load shedding process on the basis of time-based references fed back by the DSMS client.

24. The method of claim 21, wherein:
the DSMS client feeding back to the DSMS a priority value associated with the action executed by the DSMS client; and
the DSMS adapting or creating a rule governing the load shedding process on the basis of the priority value.

25. The method of claim 21, further comprising the DSMS operating:
in an operational-and-learning mode, to execute the continuous query against data items received via the input data stream, and to determine the at least one rule governing the load shedding process on the basis of the received feedback signals, when the data rate from the input data stream is below a certain limit that provides substantially no degradation of a Quality-of-Service figure that is required for the continuous query being executed by the DSMS; and
in an operational-and-load-shedding mode, to perform the load shedding process when the data rate from the input data stream exceeds the certain limit, the load shedding process being performed in accordance with the at least one rule determined during the operational-and-learning mode.

26. The method of claim 25, further comprising:
the DSMS client feeding back to the DSMS an indicator indicative of a version of processing logic used by the DSMS client to process the output data stream; and
the DSMS detecting a change in the processing logic used by the DSMS client on the basis of the received indicator;
the DSMS beginning to operate in the operational-and-learning mode upon detecting that the processing logic used by the DSMS client has changed.

27. The method of claim 21, wherein the signal sent by the DSMS client in execution of the action is provided to the DSMS as the feedback signal.

28. A method of processing stream data in a data stream management system (DSMS), the method comprising:
receiving data items in an input data stream;
storing the received data items in a data store;
executing a continuous query against the received data items to generate an output data stream;
receiving a feedback signal notifying the execution of an action by a client of the DSMS, the action comprising sending a signal, by the DSMS client, to a recipient different from the DSMS client;
determining, on the basis of the received feedback signal and the stored data items, at least one rule governing a load shedding process for discarding some of the data items as received by the DSMS or that have been partially processed by the DSMS; and
executing the load shedding process in accordance with the at least one determined rule.

29. The method of claim 28, further comprising:
executing the continuous query against sets of one or more data items in the input data stream to generate a corresponding output data item in the output data stream for each of the sets;
inserting an identifier into the output data stream, in association with each of the corresponding output data items in the output data stream, which identifier allows one or more of the data items in the corresponding set of data items in the input data stream to be identified;
storing the identifiers and the sets of one or more data items received via the input data stream;
receiving, as the feedback signal, the identifier associated with at least one data item in the output data stream whose processing by the DSMS client triggered the execution of the action; and
identifying the stored data items to be used in determining the at least one rule governing the load shedding process on the basis of received identifiers.

30. The method of claim 29, further comprising:
reading a time-based reference from, or associating a time-based reference with, a data item in each of the sets of data items in the input data stream;
inserting, as the indicators, the time-based references which have each been read from, or associated with, a data item in the set of data items in the input stream, into the output data stream in association with the corresponding output data items in the output data stream;
receiving, as the feedback signal, the time-based reference associated with at least one data item in the output data stream whose processing by the DSMS client triggered the execution of the action by the DSMS client; and
identifying stored data items to be used to determine the at least one rule governing the load shedding process on the basis of received time-based references.

31. The method of claim 28, further comprising:
receiving a priority value associated with the action executed by the DSMS client; and
adapting or creating the rule governing the load shedding process on the basis of the received priority value.

32. The method of claim 28, further comprising the DSMS operating in:
an operational-and-learning mode to execute the continuous query against data items received via the input data stream, and to determine the at least one rule governing the load shedding process on the basis of received feedback signals, when the data rate from the input data stream is below a certain limit that provides substantially no degradation of a Quality-of-Service figure that is required for the continuous query being executed by the DSMS; and
an operational-and-load-shedding mode to perform the load shedding process when the data rate from the input data stream exceeds the certain limit, the load shedding process being performed in accordance with the at least one rule determined during the operational-and-learning mode.

33. The method of claim 32, further comprising receiving an indicator indicative of the version of the processing logic used by the DSMS client to process the output data stream, and beginning to operate in the operational-and-learning mode upon detecting on the basis of the received indicator that the processing logic used by the DSMS client has changed.

34. The method of claim to 28, further comprising receiving, as the feedback signal, the signal sent by the DSMS client in execution of the action.

35. A method of processing stream data in a data stream management system client, the method comprising:
receiving data items in an output data stream generated by a data stream management system (DSMS);
processing the received data items by a processing module in accordance with stored processing logic and executing an action when triggered by the processing of one of more of the received data items, the action comprising sending a signal, by the DSMS client, to a recipient different from the DSMS client;

generating a feedback signal notifying the execution of an action by the processing module; and transmitting the generated feedback signal to the DSMS.

36. The method of claim 35, further comprising:

receiving identifiers in the data stream from the DSMS, each identifier being associated with a corresponding data item in the data stream; and generating the feedback signal so as to comprise at least one of the identifiers associated with the one or more data items in the received data stream whose processing triggered the execution of the action.

37. The method of claim 36, wherein the identifiers in the received data stream are time-based references.

38. The method of claim 35, wherein generating the feedback signal comprises generating the feedback so as to comprise a priority value associated with the action executed by the processing module.

39. The method of claim 35, further comprising generating and transmitting to the DSMS an indicator indicative of the version of the processing logic used by the processing module to process the output data stream.

40. The method of claim 35, wherein the feedback signal comprises the signal generated in execution of the action.

41. A computer program product stored in a non-transitory computer readable medium for controlling a data stream management system (DSMS), the computer program product comprising computer program instructions which, when executed by a processor in the DSMS, cause the processor to:

receive data items in an input data stream;

store the received data items in a data store;

execute a continuous query against the received data items to generate an output data stream;

receive a feedback signal notifying the execution of an action by a client of the DSMS, the action comprising sending a signal, by the DSMS client, to a recipient different from the DSMS client;

determine, on the basis of the received feedback signal and the stored data items, at least one rule governing a load shedding process for discarding some of the data items as received by the DSMS or that have been partially processed by the DSMS; and execute the load shedding process in accordance with the at least one determined rule.

42. A computer program product stored in a non-transitory computer readable medium for controlling a data stream management system client, the computer program product comprising computer program instructions which, when executed by a processor in the data stream management system client, cause the processor to:

receive data items in an output data stream generated by a data stream management system (DSMS);

process the received data items by a processing module in accordance with stored processing logic and executing an action when triggered by the processing of one of more of the received data items, the action comprising sending a signal, by the DSMS client, to a recipient different from the DSMS client;

generate a feedback signal notifying the execution of an action by the processing module; and transmit the generated feedback signal to the DSMS.

* * * * *

UNITED STATES PATENT AND TRADEMARK OFFICE
CERTIFICATE OF CORRECTION

PATENT NO. : 8,909,671 B2
APPLICATION NO. : 13/994954
DATED : December 9, 2014
INVENTOR(S) : Pallares Lopez et al.

Page 1 of 1

It is certified that error appears in the above-identified patent and that said Letters Patent is hereby corrected as shown below:

On the title page, in item (56), References Cited under "PUBLICATIONS", in Column 2, Line 2, delete "mangement"," and insert -- management", --, therefor.

In the Specification

In Column 10, Line 53, delete "27C" and insert -- 270 --, therefor.

In Column 11, Line 3, delete "DSMS 100." and insert -- DSMS 110. --, therefor.

In Column 12, Line 43, delete "QC" and insert -- CQ --, therefor.

In Column 12, Line 58, delete "TMS" and insert -- TSM --, therefor.

In Column 13, Line 10, delete "$field_n$) become" and insert -- $field_n$)) become --, therefor.

In Column 13, Line 11, delete "$field_n$," and insert -- $field_n$,) --, therefor.

In Column 14, Line 33, delete "DSSM" and insert -- DSMS --, therefor.

Signed and Sealed this
Thirtieth Day of June, 2015

Michelle K. Lee
*Director of the United States Patent and Trademark Office*